June 3, 1941. A. KORSMO ET AL Re. 21,819
POWER MOWER
Original Filed April 29, 1937 4 Sheets-Sheet 1
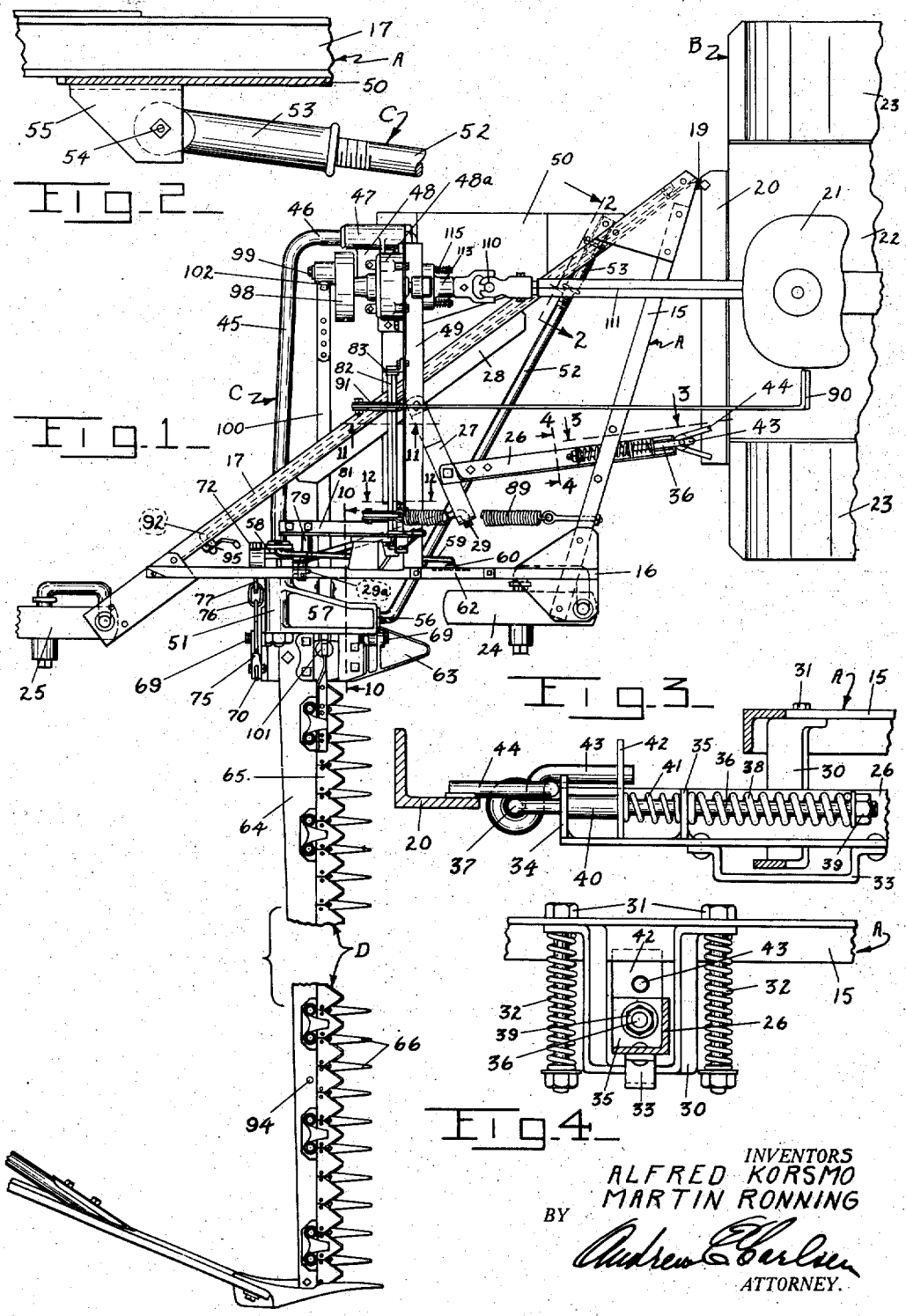
INVENTORS
ALFRED KORSMO
MARTIN RONNING
BY Andrew E. Carlson
ATTORNEY.

June 3, 1941. A. KORSMO ET AL Re. 21,819
POWER MOWER
Original Filed April 29, 1937 4 Sheets-Sheet 2
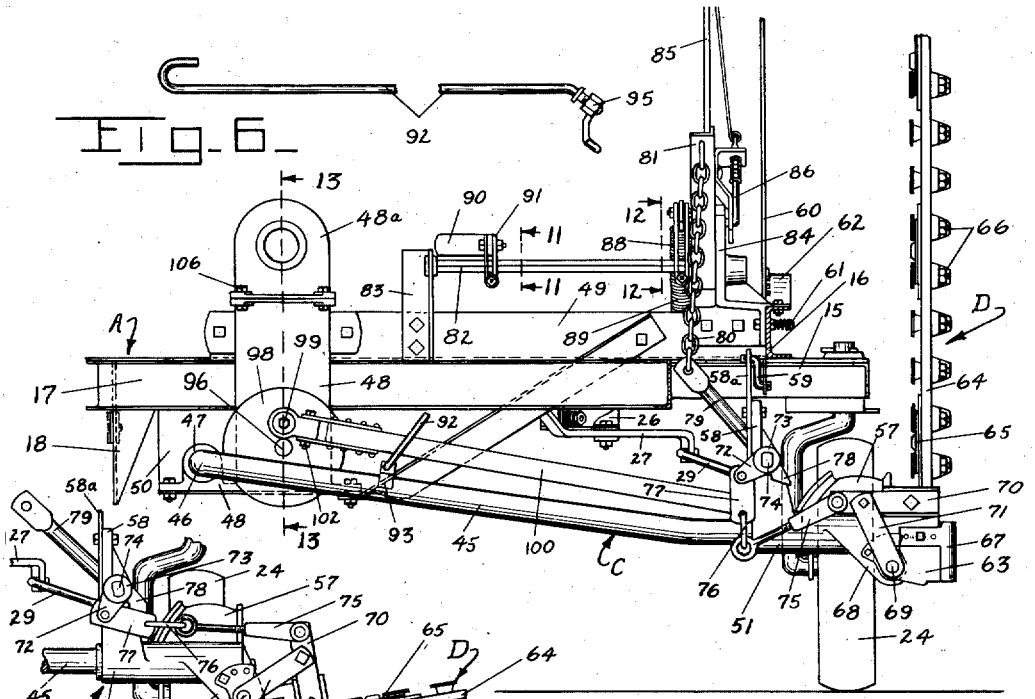
Fig. 6
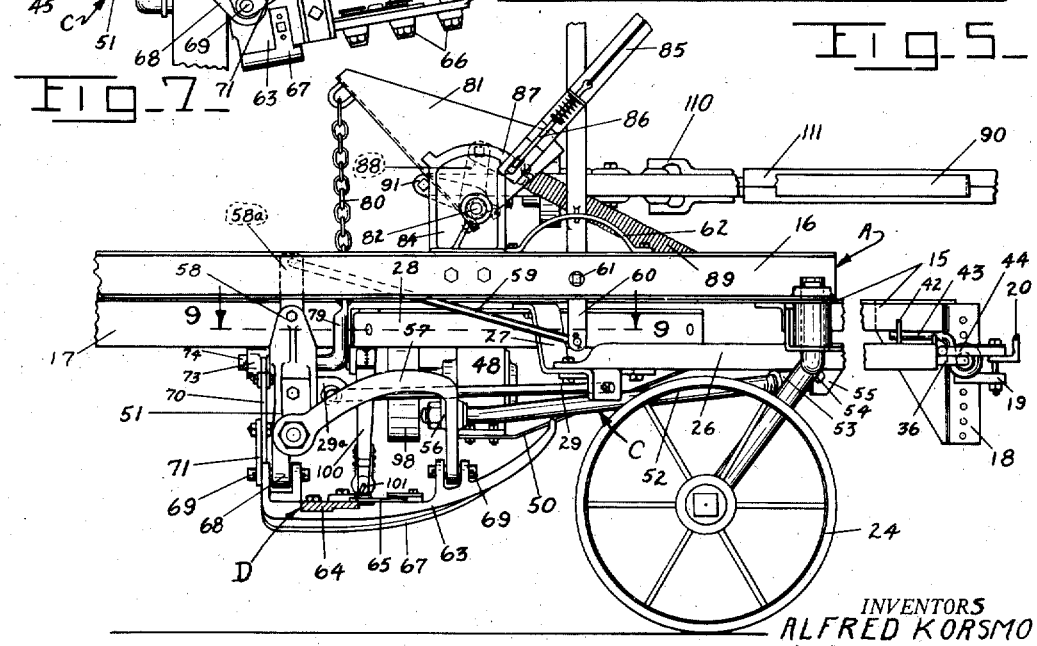
Fig. 5
Fig. 7
Fig. 8
INVENTORS
ALFRED KORSMO
MARTIN RONNING
BY
Andrew E. Carlson
ATTORNEY.

June 3, 1941. A. KORSMO ET AL Re. 21,819
POWER MOWER
Original Filed April 29, 1937 4 Sheets-Sheet 3
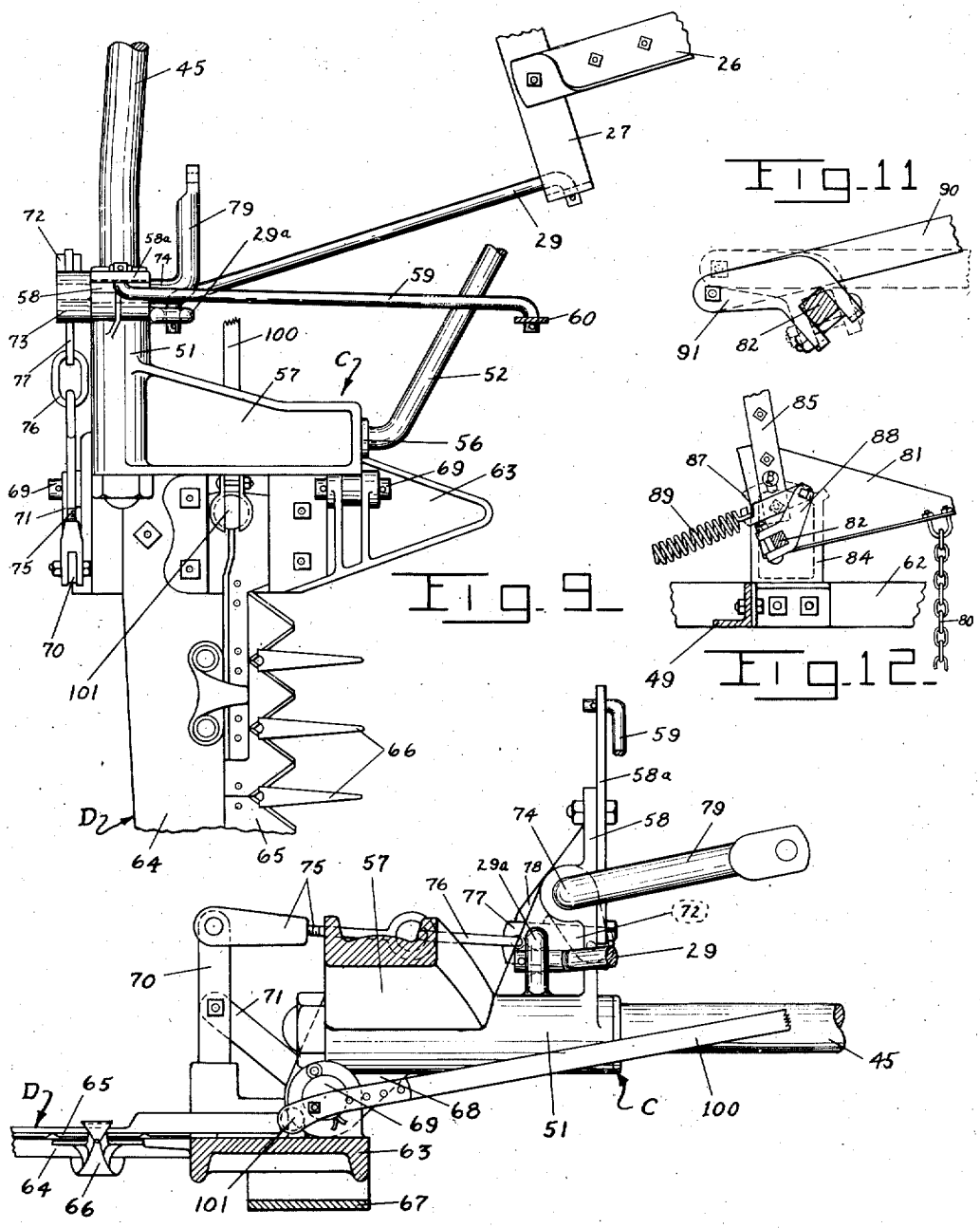
INVENTORS
ALFRED KORSMO
MARTIN RONNING
BY Andrew C. Carlson
ATTORNEY.

June 3, 1941. A. KORSMO ET AL Re. 21,819

POWER MOWER

Original Filed April 29, 1937 4 Sheets-Sheet 4

INVENTORS
ALFRED KORSMO
MARTIN RONNING

BY Andrew E. Carlson
ATTORNEY.

Reissued June 3, 1941 Re. 21,819

UNITED STATES PATENT OFFICE 21,819

POWER MOWER

Alfred Korsmo, Hopkins, and Martin Ronning, St. Louis Park, Minn., assignors to Minneapolis-Moline Power Implement Company, Minneapolis, Minn., a corporation of Delaware Original No. 2,155,716, dated April 25, 1939, Serial No. 139,708, April 29, 1937. Application for reissue August 25, 1939, Serial No. 291,950

40 Claims. (Cl. 56—25)

This invention relates to power driven mowers of the type adapted to be hitched behind and drawn by a tractor, with a cutter bar extending transversely beyond the path of tractor travel so as to cut a wide lateral swath as the machine is propelled over the field; and the primary object is to provide an efficient and practical machine of that character in which the mover unit will not only track properly with respect to the tractor but will have a maximum flexibility of action so as to permit the cutter bar to operate close to the ground and in substantial parallelism therewith even when the tractor proper is traveling over relatively rough and hilly fields. A further object is to provide means of a novel and efficient nature for transmitting power from the tractor engine to the cutter bar of the mower unit while still permitting the aforesaid flexibility of action with respect to the tractor unit. A further object is to construct the mower so that it will be comparatively economical to manufacture and will be relatively simple in construction and light in draft resistance, thus economizing on operating and maintenance cost. A further object is to provide the mower with a protective safety device so that in the event the cutter bar should strike an obstruction such as a stone or stump, the mower will become disengaged from the tractor on the cutter bar side and swing back and away from the obstruction, thus preventing breakage of parts. A still further object is to provide the transmission mechanism with a safety slip clutch to prevent damage to parts in case the cutter bar blades contact an object such as a stick or small stone that may stop the cutter without necessarily impeding its forward progress.

These and still other and more specific objects will be disclosed in the course of the following specification, reference being had to the accompanying drawings, wherein is illustrated a preferred embodiment of our invention:

Fig. 1 is a top or plan view of a mower embodying our invention, showing the mower, with portions broken away for purpose of illustration, and as coupled to a tractor, only the rear portion of which is shown.

Fig. 2 is an enlarged detail sectional elevation on the line 2—2 in Fig. 1.

Fig. 3 is an enlarged detail sectional elevation of a safety release mechanism, as taken on line 3—3 in Fig. 1.

Fig. 4 is an enlarged transverse sectional detail as taken on the line 4—4 in Fig. 1.

Fig. 5 is an enlarged rear elevation of the mower unit shown in Fig. 1, with parts removed or broken away and with the cutter bar in the vertical or inactive position to which it is adjusted when the machine is being drawn in idle condition.

Fig. 6 is an enlarged detail view of the cutter bar holdup rod detached from the machine.

Fig. 7 is a fragmentary detail elevation of the cutter bar raising mechanism as seen from the rear end with the cutter bar partially raised.

Fig. 8 is a side elevation of the mower with portions broken away or removed, and showing the cutter bar as raised to its maximum cutting elevation by the hand operated lifting lever.

Fig. 9 is an enlarged plan view of a part of the cutter bar and linkage mechanism as taken substantially on the line 9—9 in Fig. 8.

Fig. 10 is an enlarged detail sectional view on the line 10—10 in Fig. 1, showing the pitman and sickle connections.

Fig. 11 is a sectional detail as taken on line 11—11 in either Fig. 1 or Fig. 5, showing the foot lever raising connection.

Fig. 12 is a sectional detail elevation on line 12—12 in either Fig. 1 or Fig. 5, showing the balance spring and hand leverage mechanism.

Figures 13, 14:
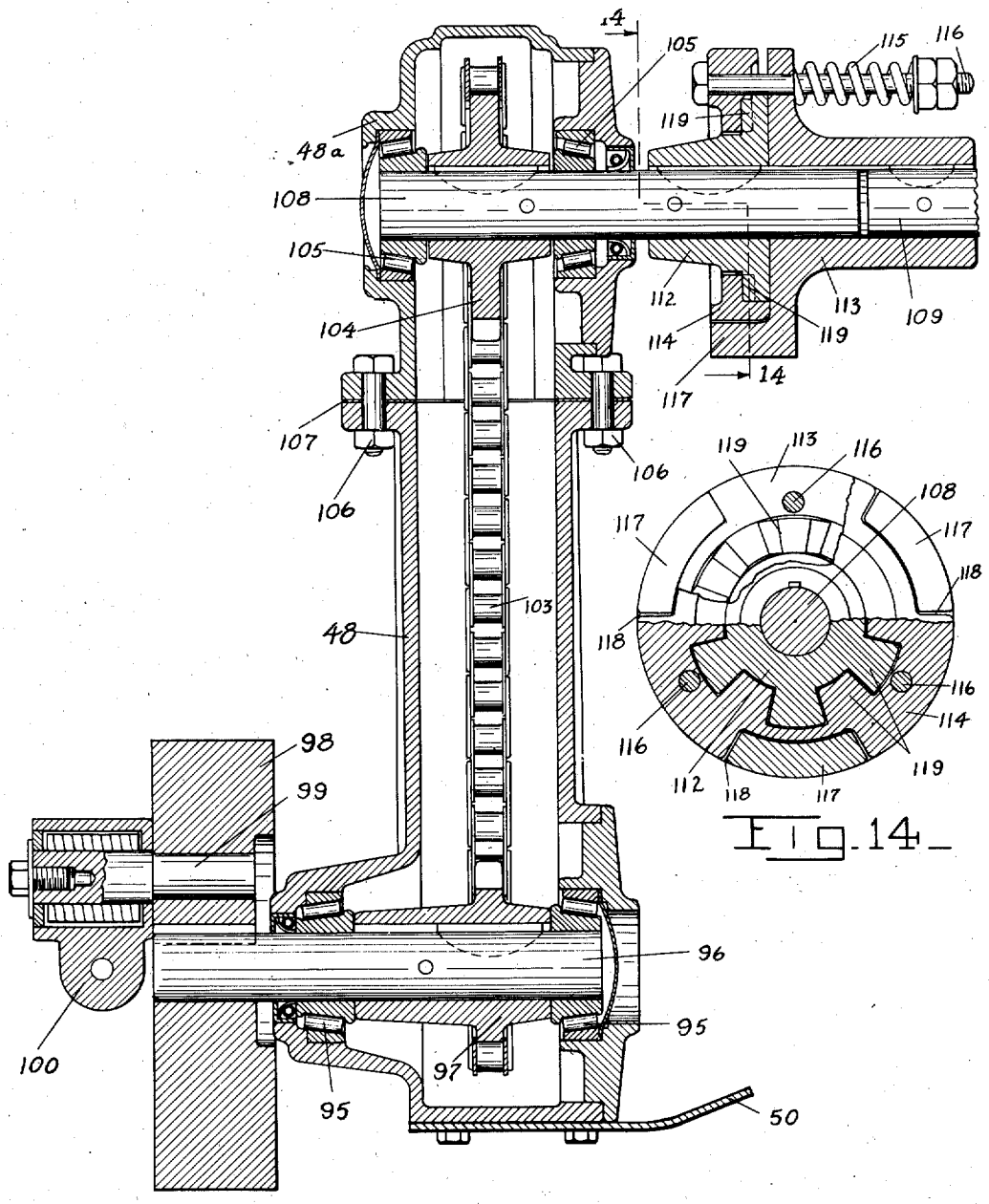
Fig. 13 is an enlarged sectional elevation through the power transmission gear housing and slip clutch mechanism, as seen on line 13—13 in Fig. 6.
Fig. 14 is a sectional detail view, with portions broken away, and as taken on line 14—14 in Fig. 13.

Referring to the drawings more particularly and by reference characters, A designates generally what may be considered the main mower frame, which frame is in the form of an obtuse-angled triangle and is rigid throughout itself. This frame comprises a front bar 15, lateral bar 16, and an oblique rear bar 17, all rigidly connected at the three corners of the frame. At its front, left corner the frame is provided with a perforated depending bracket 18 (see Fig. 8) for adjustable (vertically) connection by a clevis or link 19 to the transverse draw bar 20 at the rear end of the tractor B. It may here be noted that the tractor may be of any commercial type, and has a seat or operator's station 21 at its rear, over the usual platform 22, and between the wheel fenders 23 (Fig. 1).

The right side portion of frame A is not connected directly to the draw bar 20, and consequently is free to move vertically, and with a floating action with respect to the right hand side of the tractor. This side of the frame is supported entirely upon two wheels 24 and 25, arranged in tandem, and these wheels, being of the caster type are free to swing in any direction, on vertical axes, which is necessary when the tractor is turned or reversed, and also under an emergency circumstance presently to be explained.

The mower frame A is connected to the right hand side of the tractor draw bar 20, and thus retained in the normal, operative position shown in Fig. 1, by a releasable draft device shown in Figs. 1 and 8, and a portion of which is detailed in Figs. 3 and 4. This device includes a draft bar 26, which extends rearwardly from the tractor draw bar and under the frame bar 15, the rear end of the draft bar being pivoted to a cross lever 27. One end of the lever 27 is pivoted to an angle bar 28, fixed on frame bar 17, and the other end of the lever is connected by a link rod 29 to the cutter unit, later to be described.

The draft bar 26 extends rearwardly and in normally spaced relation under the frame beam 15, passing through a guide bracket 30. This bracket is generally U-shaped in form and is secured to the frame beam 15, by a pair of bolts 31, encircled by compression coil springs 32. These springs tend to hold the bracket up against beam 15, but may yield under pressure when there is a forced spread between members 15 and 26. This may occur either when the right hand traction wheel of the tractor drops into a ground surface depression or when the wheel 24 rides over a bump and thereby raises its corner of the frame A with respect to the tractor. The springs 32 will of course restore the bracket to the position shown in Fig. 4 when normal travel conditions are resumed. Meanwhile the bracket will always be operative to prevent relative transverse movement as between the parts A and 26. In some instances it is found desirable to employ an additional guide member 33 (Figs. 3 and 4) to limit the relative movements between frame A and draft bar 26 longitudinally with respect to the direction of travel.

The forward end of the draft bar 26 is provided with a pair of spaced but fixed lugs 34 and 35, in which is slidably mounted a rod 36 having an eye 37 at its front end. The rod is normally held in a rearward position under the action of a still spring 38, compressed between the lug 35 and nut 39 on the end of the rod. Between the two lugs 34 and 35 the rod 36 is provided with a slidable sleeve 40, which is held in a forward position by a spring 41 of relatively light tension and this sleeve carries an upstanding plate or lug 42 which is perforated to slidably receive and releasably engage a generally L-shaped hook 43. This hook is eyed to rotatably engage the eye 37 of bar 36, and when in normal, draft connecting engagement releasably secures the draft device to a V-shaped member 44 that is fixed on the tractor draw bar 20.

From the foregoing it will be seen that under normal operating conditions the draft tension between the bar 26 and member 44 will be absorbed by the spring 38 and no appreciable sliding action of the rod 36 in lugs 34—35 will occur. Under abnormal conditions, however, as occurs when the cutter bar meets with an unyielding obstruction, such as a stone or stump, then the added resistance will cause the bar 36 to compress or shorten the spring 38, with a result that the hook 43 will be pulled forwardly with respect to and out of the lug 42. The hook will then immediately disengage itself from the member 44, and the right side of frame A, together with the cutter bar, which moves with it and has in fact transmitted the abnormal resistance met with, will be free to swing backward and leftward from the pivot connection 19, the caster wheels in the meantime continuing to support the frame and cutter mechanism, and automatically changing direction according to the degree of swing which occurs. The machine is then stopped until the parts have been restored to their normal operative positions as shown.

The mower unit proper comprises an auxiliary frame C which maintains and adjustably secures the cutter or sickle bar, designated generally as D. The frame C includes a transverse radius bar 45, the left end of which has an angular extension 46 journaled in a bearing 47 of a casting 48, which is mounted rigidly on the frame A. This mounting is effected by providing the frame A with a rigid, transverse cross bar 49 and an angular, rearwardly extending bracket plate 50.

The frame C further includes an irregularly shaped casting 51 which is trunnioned on the right side end of the bar 45, for oscillating action on a transverse pivot; and this casting is further attached to the frame A by a diagonal brace bar 52. The more forward end of this bar has a coupling member 53, which is pivoted as at 54 to a lug 55 of frame A (Fig. 2). The coupling 53 is threaded on the bar 52 and may be turned thereon to adjust the effective length of the bar when necessary. The right or rear end of the bar 52 has a swivel connection at 56, and on a longitudinal axis, with a forwardly extending and generally L-shaped arm 57 of the casting 51.

From the foregoing it will be seen that the frame C has a floating action, swinging on centers 47 and 54 and that the described connections will also permit the casting 51 and its arm 57 to be oscillatably adjusted about a transverse axis, or on bar 45. This adjustment is manually effected, and without in any way effecting the floating action of the frame C, as follows:

The casting 51 has an upstanding lug 58, with a bolted extension **58*a* which is connected by a tie bar 59 to the lower end of a hand lever 60. This lever is fulcrumed as at 61 to the side beam 16 of frame A and is releasably engageable with a notched segment 62 to retain the lever in selected adjustable positions. As this adjustment is only infrequently made the lever is not shown as extended to within reach of the tractor operator when on the seat 21**, but can easily be so arranged if desired.

The sickle unit or mechanism D includes a shoe forming casting 63, which supports the cutter bar 64 and reciprocating sickle 65 operating through guards 66. The structure 64—65—66, as shown, is of generally conventional design. The shoe 63 is preferably provided with a runner 67 for riding contact with the ground, when short cutting is being done, and also operates to automatically lift the cutter bar up over obstructions or hills to prevent the sickle from cutting or digging into the ground. The hand lever 60 is employed to adjust the working angle of the cutter bar in a horizontal plane, i. e., to tilt the guards 66 up or down. Draft is applied to the cutter mechanism by the bar 29 which is pivotally connected directly to the casting 51, as at **29*a***.

As already noted, the shoe 63 is arranged, under the floating action of frame C, to follow the contour of the ground and thus maintain the proper cutting elevation of the cutter bar under all normal working conditions, and will also raise the bar to ride over obstructions where such obstruction lies in the path of the shoe 63. It is desirable, however, to provide manually operative means for quickly raising the unit D as when it is about to strike a stone or stump, and this is accomplished as follows:

It may first be noted that the shoes 63 is tiltably connected to the arm 57 and to a lug 68 of casting 51 by aligned pivot pins 69 upon the axis of which the cutter unit D swings when raised from its normally horizontal position. Rigidly secured to the shoe 63 is an upstanding arm 70, which is also braced to the rear pivot pin 69 by a brace bar 71, and this arm is connected to a lug 72, on the collar 73 of a shaft 74, by a linkage mechanism which includes a length adjustable coupler 75, a chain link 76, and a bar link 77. The collar 73 is further provided with a lug 78, adapted to engage link 77, as shown in Fig. 7, to effect a partial bar raising pull on the linkage, but is so arranged that it will disengage the linkage to permit the cutter bar to be raised to its vertical position, as shown in Fig. 5.

The shaft 74 is provided with an actuating arm or extension 79, connected by a lift chain 80 to a rocker plate 81. The plate 81 is rigidly secured to a square shaft 82, at one end of which is journaled in a bearing 83 and the other of which is journaled in a bearing bracket 84, both bearings being mounted on the cross beam 49 of the frame A. A hand lever 85 extends rigidly upwardly and forwardly from plate 81 so that it may be reached and manipulated by the tractor operator. This lever has a releasable dog or latch 86 which may be engaged with a front stop lug 87 of the member 84 (as in Fig. 8) to hold the chain 80 in its uppermost position. The shaft 82 is further provided with an arm 88 connected by a tension spring 89 to the bar 15 of frame A, and this spring has for its purpose to impart a counterbalancing action to the cutter units C and D, and thus also facilitate the adjustment movements.

A second or emergency means for oscillating the shaft 82, to lift the cutter bar, is provided in the form of an elongated foot lever 90, which extends to a point adjacent the tractor operator's seat 21, so as to be convenient for quick action. The extreme rear end of this lever pivots in an arm 91, extending rearwardly from shaft 82 and an adjacent part of the lever is adapted to bear down upon the shaft to turn it forwardly, or in a clockwise direction as seen in Fig. 11, when the lever is depressed by the operator's foot. The arrangement is such that a more pronounced movement of the shaft, under action of lever 85, is permitted without binding, as the arm 91 can continue to move upwardly and forwardly without correspondingly tilting the foot lever.

It may here be noted that the linkage mechanism 70—77 is not operative to lift the cutter bar D to its idle or "carry" position shown in Fig. 5, and the lifting devices just described are not intended to effect this extreme adjustment to vertical position. When this is to be done, as when the machine is merely being pulled over a road or to and from the field where it is to be used, then the cutter unit is lifted to vertical position by hand and is releasably secured in that position by a detachable tie bar 92 (Figs. 5 and 6), which is provided with a hook at one end for engagement with a lug 93 on bar 45, while its other end is insertable in a suitable perforation 94, Fig. 1 in the cutter bar, and there secured by a hand turned nut 95 (as indicated in Fig. 6). When the tie bar is not in use it can be conveniently secured in the channel of frame bar 17, as shown in Fig. 1.

Attention is now directed to the mechanism for transmitting power from the power take-off shaft of the tractor to the sickle bar of the mower. The cast transmission housing 48, as already noted, is rigidly mounted on the frame A. In the lower end of this housing is journaled, in suitable roller bearings, 95, a pitman drive shaft 96, which shaft is provided within the housing with a sprocket pinion 97. At its rear or outer end the shaft 96 carries an eccentric in the form of a disc or rotor 98 having a crank pin 99, to which one end of a pitman rod 100 is attached. The opposite end of the pitman rod is attached to the sickle bar 65 by a ball and socket connection 101. Thus, rotation of the shaft 96 will impart longitudinal reciprocating action to the sickle bar, and the connection 101 cooperating with a second joint 102, near pin 99, will permit the necessary flexibility of adjustment required in the various associated parts of the machine.

The sprocket pinion 97 is driven by a roller sprocket chain 103 from a pinion 104 on a shaft 108 journaled in roller bearings 105 in an upper section 48a of the housing at 106, and shims 107 may be interposed, as wear occurs, to take up slack in the chain 103. It may here be noted that the housing not only completely encloses this transmission unit, but is preferably sealed so as to exclude dust and dirt and permits the sprocket mechanism to run in a bath of lubricating oil.

The shaft 108 extends forwardly through the upper housing section 48a, and into an overload or safety release clutch (Figs. 13 and 14) into which also extends a stub shaft 109. The shaft 109 is connected by a universal joint 110 to a telescopic shaft 111, that connects by a similar universal joint to the customary power take-off shaft (not shown) of the tractor.

The release clutch comprises a pair of flanged collar members 112 and 113 fixed on the respective shafts 108 and 109, although shaft 108 projects, rotatably, into collar 113. An annular ring 114 is pressed against the flange of collar 112 by compression springs 115 secured about three bolts 116 which extend through the members 113 and 114. Lugs 117 of collar 113 engage in notches 118 of the ring 114, to thus prevent rotation of the ring relative to said collar. Inwardly opposing or contact faces of the members 112 and 114 are annularly corrugated as at 119, thus providing relatively flat and wide teeth and notches that normally retain self-registering engagement and through which the power is transmitted from collar 113 to collar 112. Should the sickle bar 65 engage a stick or other obstruction through which it cannot cut then the resistance thus offered will be transmitted back to the slip clutch, in which event the ring 114 will yield, under the action of the springs 115 and the shaft 109 will be able to continue rotation with respect to shaft 108 without breaking any parts of the power transmission mechanism. The noise produced by the escape movement of the teeth of corrugations 119 over each other will of course immediately inform the operator so that the power can be shut off and the obstruction removed.

The use and operation of the machine may be briefly described as follows:

The mower is normally drawn along behind the tractor B in the relative position shown in Fig. 1, and with the sickle unit D projecting to one side to cut a wide swath in a path laterally adjacent to the path of the tractor, cutting power being transmitted from the power take-off shaft of the tractor to the sickle bar 65 through the transmission elements 111, 110, 109, 113, 114, 112, 108, 104, 103, 97, 96, 98, 99, 100, and 101. Should the sickle bar 65 become stuck or jammed by an obstruction passing between the guard teeth 66, then the release mechanism shown in Figs. 13 and 14 will operate to prevent the overload or excess strain from injuring any part of the mechanism.

The right side and rear portions of the frame A will have a full floating action with respect to the tractor so that it may freely follow both transverse and longitudinal undulation of the ground surface contour.

These oscillating actions occur about the hitch clevis or link 19 which supports the front end of the frame A on the left end of the draw bar 20, the connection being such as to not only constitute a vertical pivot axis about which the frame may swing when the connection 40—44 is released, but has sufficient play or freedom of action to permit the right side of frame A to move up and down about a horizontal longitudinal axis, and to permit the rear end of the frame, supported on the wheel 25, to oscillate up and down about a transverse horizontal axis. As the connection 19 forms a single support for the frame at this point it is apparent that these three axes substantially intersect each other.

While thus moving, the frame A is supported at one corner (19) by the tractor draw bar 20, and at the other two corners by the caster wheels 24 and 25. The hitch connection 26 is so arranged as to properly equalize or distribute the draft pull to frames A and C, so that these frames will always maintain proper operative positions with respect to the tractor B, while movably supported on the casters. Should the cutter unit D contact an immovable obstruction such as a stump or stone then the resistance will be transmitted back through the draft bar 26 to operate the release detailed in Figs. 3 and 4. Under such circumstances the entire frame assembly A, C, and D will be free to swing rearwardly and to the left on the pivot connection 19 (Fig. 1) thus prevent what might otherwise result in serious damage. When the obstruction is passed the tractor is stopped and the draft bar 26 is restored to its normal connected engagement with the draw bar bracket 44.

The sickle unit D, when operating, is connected at 69 to the frame C, and the latter is in turn pivoted (as at 47 and 54) to the frame A in such a manner that the units C and D have a full floating action with respect to the frame A, but without in any way interfering with the adjusting devices or draft connections, which are free to fully serve in their respective capacities. Under these circumstances it will be seen that the casting 51, together with all its associated parts, including the sickle unit, are free to move vertically, or "float," into both high and low positions with respect to the caster wheels 24 and 25.

As the machine progresses over the field, if the operator observes an obstruction in the path of the sickle unit, he steps on the foot lever 90, which action operates to partially lift the cutter unit, as indicated in Fig. 7, and this lift is ordinarily sufficient to carry the cutter over the stump or stone to be avoided. When it is desired to further raise and secure the cutter unit, as when the machine is transported idle, then a greater lifting action can be produced by the operator grasping the lever 85 and pulling it forward to latching position as shown in Fig. 8. This completely lifts the shoe 63 to its uppermost position and partially lifts or swings the cutter unit to its vertical position. If it is desired to secure the unit D in its entirely vertical position, as shown in Fig. 5, the unit is moved up the additional distance by hand, which the linkage 76—77 permits, and is there secured by the detachable tie rod 92.

It is understood that suitable modifications may be made in the structure, design, and details of the machine, as herein disclosed, without departing from the spirit and scope of the appended claims. Having now therefore fully illustrated and described the preferred embodiment of our invention, what we claim to be new and desire to protect by Letters Patent is:

1. A mower for attachment to a tractor or the like comprising a frame pivotally connected at one side to the tractor, fore and aft wheels supporting the other side of the frame and with freedom for self adjusting movement with the ground surface in the direction of travel, a releasable draft connection between said other side of the main frame and the tractor, and a cutting device attached to and extending transversely beyond the said other side of the main frame.

2. A mower for attachment to a tractor or the like comprising a frame pivotally connected at one side to the tractor, fore and aft wheels supporting the other side of the frame and with freedom for self adjusting movement with the ground surface in the direction of travel, a mowing unit attached to said main frame and extending laterally therebeyond, means releasably connecting the frame to the tractor at a point spaced transversely with respect to the pivot connection, and means, responsive to abnormal resistance to the forward movement of the mowing unit, for releasing the releasable connection to permit the frame and mowing unit to swing rearwardly and transversely on the pivot connection to the tractor.

3. An implement for attachment behind a tractor, comprising a substantially triangular frame pivotally connected at one corner to the tractor, caster wheels supporting the other two corners of the frame from the ground, a working tool adjustably carried by the frame, a draft device connecting the frame to the tractor at a point spaced from the pivotal connection, and means, operable by abnormal resistance to the forward movement of the working tool, for automatically releasing the draft device from the tractor.

4. An implement for attachment behind a tractor, comprising a substantially triangular frame pivotally connected at one corner to the tractor, caster wheels supporting the other two corners of the frame from the ground, a working tool adjustably carried by the frame, a draft device connecting the frame to the tractor at a point spaced from the pivotal connection, and means, operable by abnormal resistance to the forward movement of the working tool, for automatically releasing the draft device from the tractor, said other two corners of the frame, together with their supporting casters, being disposed at one side and with one in advance of the other.

5. A mower for attachment behind a tractor comprising a main frame pivotally connected to the tractor at transversely spaced points to permit oscillating movement of the main frame in a vertical plane parallel with the direction of travel but normally maintaining the frame against transverse movement with respect to the path of travel, a wheel supporting a front part of the main frame with respect to the ground, a second frame pivotally connected, at spaced points, to the main frame, to permit vertical movement of one side of the second frame with respect to the main frame, and in a plane extending transversely with respect to the direction of travel, and a cutting mechanism operatively connected to the vertically movable side of the second frame.

6. A mower for attachment behind a tractor comprising a main frame pivotally connected to the tractor at transversely spaced points to permit oscillating movement of the main frame in a vertical plane parallel with the direction of travel but normally maintaining the frame against transverse movement with respect to the path of travel, a wheel supporting a front part of the main frame with respect to the ground, a second frame pivotally connected, at spaced points, to the main frame, to permit vertical movement of one side of the second frame with respect to the main frame, and in a plane extending transversely with respect to the direction of travel, a cutting unit carried by the second frame, and means for transmitting operating power from the tractor to the cutting unit.

7. A mower comprising a main frame, means for establishing a draft connection between the frame and a tractor or the like, said means allowing movement of the frame in a vertical plane parallel with the direction of travel but normally restraining the frame from movement transversely with respect to said plane, fore and aft caster means supporting the frame from the ground, a cutter bar secured to and extending transversely from the frame, and means rendered operative by said cutter bar contacting with an unyielding obstruction, for releasing a part of the draft connection to permit the frame to swing on a vertical axis from another part of the draft connection while supported on the caster means.

8. A mower for attachment behind a tractor comprising a main frame supported at one side by fore and aft caster ground wheels so that said side will be self adjusting longitudinally with respect to the contour of the ground surface travelled over, a second frame pivoted to the main frame for oscillating adjustment, at one side, in a vertical transverse plane extending between said fore and aft caster wheels, a cutting unit pivotally secured at its inner end to the second frame, and means for adjusting the second frame and cutting unit to vertically and angularly adjust the cutting unit.

9. A mower for attachment behind a tractor comprising a main frame supported at one side by fore and aft ground wheels so that said side will be self adjusting with respect to the ground surface contour, a second frame pivoted to the main frame for oscillating adjustment, at one side, in a vertical transverse plane, a cutting unit pivotally secured at its inner end to the second frame, and means for adjusting the second frame and cutting unit to vertically and angularly adjust the cutting unit, said cutting unit including a reciprocating sickle bar extending laterally from a point longitudinally intermediate said fore and aft ground wheels; and means for transmitting power from the attached tractor to the sickle bar.

10. An implement for attachment behind a tractor, comprising a main frame pivotally connected at one lateral point to the tractor, a pair of fore and aft caster wheels supporting the frame at the side opposite to the said pivotal connection whereby both ends of the frame may oscillate in a vertical plane at the wheel supported side and from a floating axis between said wheels, a releasable draft connection between this wheel supported side of the frame and the tractor, and a working tool carried by the said frame.

11. An implement frame mounting for the rear of a tractor, comprising a frame pivotally connected at one side to the tractor, fore and aft caster wheels supporting the other side of the frame independently of the tractor, and a releasable hitch connecting the wheel supported side of the frame to the tractor.

12. A mower for attachment to a tractor comprising a frame pivotally connected to the tractor, a cutter unit carried by the frame, a link connected at spaced points respectively with the frame and the cutter unit, and a releasable draft device extended between the said link and the tractor.

13. A mower comprising a frame, a cutter unit pivotally supported by the frame, means for raising and lowering the cutter unit comprising an arm secured to the cutter unit, a shaft journaled parallel with the axis on which the cutter swings, an adjustable coupling between the arm and shaft and including a lug on the shaft and a bar link pivotally connected to the lug, a member radially extended from the shaft and adapted to engage the said bar link to partially raise the cutter unit but to clear the same as the raising action continues, and means for rotating the shaft to bring about the raising and lowering of the cutter unit.

14. An implement for attachment behind a tractor, comprising a frame flexibly connected at one side to the tractor, longitudinally spaced fore and aft ground engaging means supporting the other side of the frame for tilting motion from the flexible connection in a transverse vertical plane in response to undulations in the contour of the ground, a flexible draft device connecting the said other side of the frame to the tractor and providing freedom for such tilting movement of the frame relative to the tractor, and a tool carried by the frame.

15. An implement for attachment behind a tractor, comprising a frame flexibly connected at one side to the tractor, a releasable draft connection between the other side of the frame and the tractor, a working tool supported from the frame at the side having the said draft connection, and means for supporting the frame including a ground engaging member disposed between the tool and the tractor.

16. An implement for attachment behind a tractor, comprising a frame flexibly connected at one side to the tractor, a draft connection between the other side of the frame and the tractor and providing freedom for vertical movements of the fore part of the frame at this side, a cutting unit supported from the frame, and means for supporting said other side of the frame including a caster wheel supporting the said fore part of the frame and for ground surface engagement at a point forward of the cutting unit.

17. In an implement for attachment behind a tractor or the like, a frame device connected at one side to the tractor and having freedom for vertical movement at its opposite side, a cutting unit supported from this opposite side of the frame, means supporting the frame including a ground wheel disposed between the cutting unit and the tractor and supporting the frame for vertical movements responsive to variations in the contour of the ground, and a flexible draft device connecting the wheel supported side of the frame to the tractor.

18. A tractor-mower comprising a main frame connected at one side to one side of the tractor, a second frame adjustably secured to the main frame, a mower carried by the second frame and extending laterally therefrom, a link connected at its opposite ends to the respective frames, and a draft element connecting the link with the other side of the tractor whereby the draft transmitted thereby will be applied through the link directly to both frames.

19. In a tractor mower in which the tractor includes a drawbar, the combination with the drawbar of a mower comprising a frame and cutting mechanism carried thereby, said frame being pivotally supported on and connected to the drawbar at a single point of connection for pivotal movement about both a horizontal and a vertical axis, said axes substantially intersecting, and means for normally holding the cutting mechanism in operative position.

20. In a tractor mower in which the tractor includes a drawbar, the combination with the drawbar of a mower comprising a rearwardly and diagonally extending frame and cutting mechanism carried thereby, a ground engaging means supporting the rear end of the frame, said frame being pivotally supported on and connected at its forward end to said drawbar at a single point of connection for movement about both a horizontal and a vertical axis, said axes substantially intersecting, and means for normally holding the cutting mechanism in operative position.

21. In a tractor mower in which the tractor includes a power take-off shaft and a drawbar, the combination with the drawbar of a single frame member pivotally connected to the drawbar at a single point of connection and extending rearwardly and diagonally therefrom, a ground engaging means for supporting the rearward end of said frame, mower cutting mechanism carried by the frame, and driving mechanism for the cutting mechanism driven by the power take-off shaft.

22. In a tractor mower in which the tractor includes a drawbar, the combination with the drawbar of a single frame member pivotally connected to the drawbar at a single point of connection for movement about both a horizontal axis and a vertical axis and extending rearwardly and diagonally therefrom, a ground engaging means for supporting the rearward end of said frame, mower cutting mechanism carried by the frame, and means for holding the cutting mechanism in operative position.

23. In a tractor mower in which the tractor includes a drawbar, the combination with the drawbar of a single frame member pivotally connected to the drawbar at a single point of connection for movement about both a horizontal axis and a vertical axis and extending rearwardly and diagonally therefrom, a ground engaging means for supporting the rearward end of said frame, mower cutting mechanism carried by the frame, and releasable means for holding the cutting mechanism is operative position, said means being releasable to permit the cutting mechanism to swing about the aforesaid vertical axis when the cutter bar strikes an obstruction.

24. In a tractor mower in which the tractor includes a drawbar, the combination with the drawbar of a mower comprising a rearwardly and diagonally extending frame and cutting mechanism carried thereby, means for pivotally supporting and connecting the forward end of said frame on and to the drawbar at a single point of connection, and a ground engaging means supporting the rear end of the frame, said ground engaging means being disposed rearwardly of and substantially in alignment with the inner end of the cutting mechanism.

25. In a tractor mower in which the tractor includes a drawbar, the combination with the drawbar of a mower comprising a frame and cutting mechanism carried thereby, said frame being pivotally supported on and connected to said drawbar at a single point of connection for movement about both a horizontal axis and a vertical axis, said axes substantially intersecting, and releasable latch means for holding the cutting mechanism and frame in operative position with respect to the tractor, said latch means being releasable to permit the release of the cutting mechanism and frame from the aforesaid operative position about the aforesaid vertical axis when the cutter bar strikes an obstruction.

26. In a tractor mower in which the tractor includes a drawbar, the combination with the drawbar of a mower comprising a rearwardly and diagonally extending frame and cutting mechanism carried thereby, a ground engaging means supporting the rear end of said frame, said frame being pivotally supported on and connected at its forward end to said drawbar at a single point for movement about both a horizontal axis and a vertical axis, said axes substantially intersecting, and releasable means for holding the cutting mechanism and frame in operative position with respect to the tractor, said means being releasable to permit the release of the cutting mechanism and frame from the aforesaid operative position about the aforesaid vertical axis when the cutter bar strikes an obstruction.

27. In a tractor mower in which the tractor includes a drawbar, the combination with the drawbar of a mower comprising a frame and cutting mechanism carried thereby, said frame being pivotally supported on and connected to the drawbar at a single point of connection for movement about both a horizontal axis and a vertical axis with respect to the drawbar, and means for holding the cutting mechanism and frame in operative position.

28. In a tractor mower in which the tractor includes a drawbar, the combination with the drawbar of a mower comprising a rearwardly and diagonally extending frame and cutting mechanism carried thereby, a ground engaging means for supporting the rear end of the frame, and pivotal means for supporting and connecting the forward end of the frame on and to the drawbar at a single point of connection, said pivotal means providing for both horizontal and vertical movement of the frame with respect to the drawbar about closely spaced axes.

29. In a tractor mower in which the tractor includes a power take-off shaft and a drawbar, the combination with the drawbar of a mower comprising a single frame member and cutting mechanism carried thereby, means for pivotally connecting the frame to the drawbar at a single point of connection, and driving means for driving the cutting mechanism from the power take-off shaft.

30. In a tractor mower in which the tractor includes a drawbar, the combination with the drawbar of a mower comprising a single rearwardly and diagonally extending frame member pivotally connected to said drawbar, a caster wheel supporting the rear end of the frame, a coupling bar movably associated with the frame member and extending transversely therebelow, a yoke carried by said coupling bar, a cutter bar hingedly associated with said yoke, a rockshaft movably carried in brackets secured to the frame member, lifting connections between the rockshaft and the cutting bar, lifting means for rocking the rockshaft for lifting the cutter bar, and means connected to the aforesaid yoke and to the drawbar for holding said cutter bar in operative position.

31. In a tractor mower in which the tractor includes a drawbar, the combination with the drawbar of a mower comprising a single rearwardly and diagonally extending frame member pivotally connected to said drawbar, a caster supporting the rear end of the frame, a coupling bar movably associated with the frame member and extending transversely therebelow, a yoke carried by said coupling bar, a cutter bar hingedly associated with said yoke, a rockshaft movably carried in brackets secured to the frame member, lifting connections between the rockshaft and the cutter bar, lifting means carried on the frame member for limited free movement with respect thereto, said means being operatively associated with the rockshaft for rocking same to lift the cutter bar, and means connected to the aforesaid yoke and to the drawbar for holding said cutter bar in operative position.

32. In a tractor mower in which the tractor includes a drawbar, the combination with the drawbar of a mower comprising a frame and cutting mechanism carried thereby, said frame being pivotally supported on and connected to said drawbar at a single point of connection for movement about both a horizontal axis and a vertical axis, said axes substantially intersecting, releasable latch means for holding the cutting mechanism and frame in operative position with respect to the tractor, said latch means being releasable to permit the release of the cutting mechanism and frame from the aforesaid operative position about the aforesaid vertical axis when the cutter bar strikes an obstruction, and a balancing spring connected at one end to the cutting mechanism and at the other end to a point rearward of the drawbar.

33. In a tractor mower in which the tractor includes a drawbar, the combination with the drawbar of a mower comprising a rearwardly and diagonally extending frame and cutting mechanism floatably carried thereby, a ground engaging means supporting the rear end of the frame, said frame being pivotally supported on and connected at its forward end to said drawbar at a single point of connection for movement about both a horizontal and a vertical axis, said axes substantially intersecting, means for normally holding the cutting mechanism in operative position, and lifting means for raising the cutter bar, said lifting means being lockable only when the cutter bar is in raised position.

34. In combination with a tractor having a power take-off shaft, a mower comprising a substantially triangular frame supported on the tractor for vertical movement with respect thereto, a vertically disposed housing carried by the frame, a mower frame carried by said housing for movement about a vertical axis, cutting mechanism on the mower frame, and drive mechanism located entirely within the housing and operatively connected to the power take-off shaft and to the cutting mechanism.

35. In combination with a tractor having a power take-off shaft, a mower comprising a substantially triangular frame structure supported at its forward end on the tractor, ground engaging means supporting the rearward end of the frame, a mower frame including a single vertically disposed housing support carried by the first frame, cutting mechanism carried by the mower frame, and drive mechanism associated with the mower frame and located entirely within the housing and driven by the power take-off shaft of the tractor, said drive mechanism including a driving connection to the cutting mechanism, said driving connection being located rearwardly of the housing support.

36. In combination with a tractor having a power take-off shaft, a mower comprising a frame structure supported at its forward end on the tractor, ground engaging means supporting the rearward end of the frame, a vertically disposed housing carried by said frame, a mower frame supported by the housing, cutting mechanism carried by the mower, drive mechanism carried and entirely enclosed by said housing, a flexible drive connection between the drive mechanism and the tractor power take-off shaft, and a pitman operatively connecting the cutting mechanism and the drive mechanism, said pitman being located rearwardly of the aforesaid housing.

37. In combination with a tractor having a power take-off shaft, a mower comprising a frame supported on the tractor for vertical movement with respect thereto, a vertically disposed housing carried by the frame, a mower frame carried by said housing for movement about a vertical axis, cutting mechanism on the mower frame, and drive mechanism carried entirely within the housing including an upper shaft operatively connected to the power take-off shaft, and a lower shaft connected at its rear end to the cutting mechanism.

38. In combination with a tractor having a power take-off shaft, a mower comprising a frame supported on the tractor for vertical movement with respect thereto, a vertically disposed housing carried by the frame, a mower frame bar having a forward extension at one end journaled to said housing, cutting mechanism at the other end of the mower frame bar, and drive mechanism entirely enclosed within the housing and operatively connected to the power take-off shaft and to the cutting mechanism.

39. In combination with a tractor having a power take-off shaft, a mower comprising a frame structure supported at its forward end on the tractor, ground engaging means supporting the rearward end of the frame, a generally vertical drive mechanism housing mounted on the frame, a mower frame hingedly secured at one end to the housing, cutting mechanism carried by the mower frame, and drive mechanism associated with the mower frame and driven through said housing by the power take-off shaft of the tractor, said drive mechanism including a driving connection to the cutting mechanism, said driving connection being located rearwardly of the housing.

40. In combination with a tractor having a power take-off shaft, a mower comprising a frame structure supported at its forward end on the tractor, ground engaging means supporting the rearward end of the frame, a vertically disposed housing carried by said frame, a mower frame pivotally supported at one end by the housing, cutting mechanism carried by the mower, drive mechanism carried and enclosed by said housing, a flexible drive connection between the drive mechanism and the tractor power take-off shaft, and a pitman operatively connecting the cutting mechanism and the drive mechanism, said pitman being located rearwardly of the aforesaid housing, and said ground engaging means including not more than one wheel disposed rearwardly of the cutting mechanism.

ALFRED KORSMO.
MARTIN RONNING.